United States Patent
Fujii et al.

(10) Patent No.: US 6,562,536 B2
(45) Date of Patent: May 13, 2003

(54) CHARGE-CONTROLLING AGENT AND TONER USING THE SAME

(75) Inventors: Keiichi Fujii, Tokyo (JP); Hideki Ganbayashi, Saitama-ken (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/983,352

(22) Filed: Oct. 24, 2001

(65) Prior Publication Data

US 2002/0081512 A1 Jun. 27, 2002

(30) Foreign Application Priority Data

Oct. 30, 2000 (JP) ........................ 2000-330429

(51) Int. Cl.$^7$ .............................. G03G 9/097
(52) U.S. Cl. ................................ 430/108.22
(58) Field of Search ..................... 430/108.22

(56) References Cited

U.S. PATENT DOCUMENTS

| | | | |
|---|---|---|---|
| 4,021,358 A | 5/1977 | Tomono et al. | 252/62.1 |
| 4,455,361 A * | 6/1984 | Narusawa et al. | 430/137 |
| 4,683,188 A | 7/1987 | Suzuki et al. | 430/110 |
| 4,780,553 A | 10/1988 | Suzuki et al. | 556/26 |
| 5,147,750 A * | 9/1992 | Nakanishi | 430/110 |
| 5,491,043 A | 2/1996 | Dix et al. | 430/110 |

FOREIGN PATENT DOCUMENTS

| | | |
|---|---|---|
| JP | 58-171060 | 10/1983 |
| JP | 3-27052 | 2/1991 |

* cited by examiner

Primary Examiner—John Goodrow
(74) Attorney, Agent, or Firm—Armstrong, Westerman & Hattori, LLP

(57) ABSTRACT

A charge-controlling agent comprising a polyamine having a repeating structure represented by the following general formula (I):

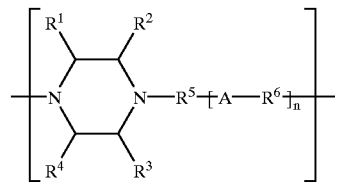

The symbols in the formula are defined in the specification. Also disclosed is a toner using the charge-controlling agent.

7 Claims, No Drawings

CHARGE-CONTROLLING AGENT AND TONER USING THE SAME

FIELD OF THE INVENTION

The present invention relates to a charge-controlling agent for controlling chargeabilities of toners used for electrophotography, electrostatic recording, electrostatic printing, and the like. The invention also relates to a toner using the charge-controlling agent.

BACKGROUND OF THE INVENTION

In copying machines and printers utilizing the principle of electrophotography, a developing method is employed wherein a dry toner charged beforehand is fed to an electrostatic latent image formed on an electrophotographic photosensitive body to form a visible image. Generally, in the dry toner, the surface of toner particles is charged by friction between the toner particles in the case of single-component system in which a magnetic powder such as iron powder is internally incorporated into the toner particles. In the case of two-component system, the surface of toner particles is charged by mixing and stirring toner particles with a magnetic powder. Charging properties such as initial chargeability, stability of charge-level with the lapse of time, and saturated charged amount of the toner particles considerably affect the quality of electrostatic print. Therefore, for controlling always these physical properties and maintaining a stable state, a positively chargeable or negatively chargeable charge-controlling agent is frequently added in toner particles at the production of the particles.

As a charge-controlling agent which imparts chargeability to black toners, nigrosine has been hitherto employed. However, nigrosine has a strong coloring power and adversely affects hue of color except black, so that it is difficult to apply it to color toners whose demand has been recently increasing.

Moreover, safety requirement of chemical substances becomes gradually severe in recent years. Even in the case of charge-controlling agent, it is required to reduce volatile organic compounds (VOC) as much as possible, which generate upon kneading with a toner resin or upon actual high-speed printing on a copying machine. However, nigrosine contains a trace amount of aniline and complete removal of aniline is difficult, so that there is a possibility that the use of nigrosine containing a trace amount of smelly and harmful aniline may be regulated in future.

As charge-controlling agents other than nigrosine, there are mentioned, for example, quaternary ammonium salts disclosed in JP-A-62-53944 (corresponding to U.S. Pat. Nos. 4,683,188 and 4,780,553)(The term "JP-A" used herein means an "unexamined published Japanese patent application") and JP-A-3-27052, a polyamine having a repeating unit wherein a pyrrole ring or phenylimino group and a piperazine ring or imino group are bonded through methylene group described in JP-A-51-9456 (corresponding to U.S. Pat. No. 4,021,358), a polyamine having a repeating unit wherein a phenylimino group and a piperazine ring are bonded through methylene group described in JP-A-58-171060, and a polyamine selected from the group consisting of poly(phenylimino) and poly(alkylimino) disclosed in JP-A-6-348061 (corresponding to U.S. Pat. No. 5,491,043).

The quaternary ammonium salts disclosed in JP-A-62-53944 (corresponding to U.S. Pat. No. 4,780,553) and JP-A-3-27052 are colorless or light in color, so that it is possible to employ them as charge-controlling agents. However, these compounds have drawbacks that thermal stability is insufficient and thus, the compounds tend to cause thermal decomposition and coloring, when kneading with a binder resin for toner, and also chargeabilities are considerably inferior as compared with nigrosine.

Moreover, the polyamine disclosed in JP-A-6-348061 (corresponding to U.S. Pat. No. 5,491,043) has a drawback that it is a compound having a low melting point and thus, tends to be colored, when kneading with a toner resin, and therefore, it is difficult to employ it as a charge-controlling agent for color toners. Furthermore, the polyamines disclosed in JP-A-51-9456 (corresponding to U.S. Pat. No. 4,021,358) and JP-A-58-171060 cause almost no coloring but have drawbacks that thermal decomposition occurs, when kneading with a binder resin for toner, they have considerably poor dispersibility in a toner resin, and they are not always excellent in chargeabilities. As described above, there has not yet been found a charge-controlling agent which is colorless or light in color, has excellent chargeabilities, is applicable to color toners, and also emits only a little amount of VOC.

SUMMARY OF THE INVENTION

An objective of the present invention is to provide a charge-controlling agent which can be applied to not only black toners, but color toners, emits only a little amount of VOC, and is excellent in chargeabilities, particularly in charged amount and stability of charge-level.

Another objective of the present invention is to provide a toner comprising the charge-controlling agent.

Other objectives and effects of the present invention will become apparent from the following description.

For solving the above problem, the invention provides:

(1) a charge-controlling agent comprising a polyamine having a repeating structure represented by the following general formula (I):

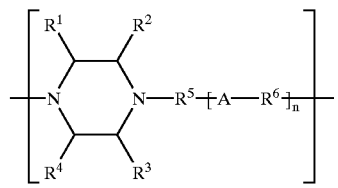

wherein $R^1$ to $R^4$ each independently represents an alkyl group having 1 to 4 carbon atoms or hydrogen atom, n represents 0 or 1, and when n=0, $R^5$ represents an alkylene group having 4 to 15 carbon atoms, which may have a substituent selected from the group consisting of alkyl groups having 1 to 4 carbon atoms and phenyl group, and when n=1, A represents a phenylene group in which the hydrogen atom(s) on the ring may be replaced by alkyl group(s) having 1 to 4 carbon atoms, and $R^5$ and $R^6$ each independently represents an alkylene group having 1 to 8 carbon atoms, provided that the sum of the carbon atoms of the alkylene groups represented by $R^5$ and $R^6$ ranges from 2 to 9.

DETAILED DESCRIPTION OF THE INVENTION

The charge-controlling agent of the invention comprises a polyamine having a repeating structure represented by the above general formula (I). In the above general formula (I), $R^1$ to $R^4$ each independently represents an alkyl group having 1 to 4 carbon atoms or hydrogen atom, and n represents 0 or 1.

In the case that n is 0, $R^5$ represents an alkylene group having 4 to 15 carbon atoms, which may have a substituent selected from the group consisting of alkyl groups having 1 to 4 carbon atoms and phenyl group. Examples of such a case of $R^5$ include linear alkylene groups such as butylene group, pentamethylene group, hexamethylene group, heptamethylene group, octamethylene group, nonamethylene group, decamethylene group, undecamethylene group, dodecamethylene group, tridecamethylene group, tetradecamethylene group, and pentadecamethylene group; alkylene groups in which part of hydrogen atoms is replaced by substituent(s) selected from the group consisting of methyl group, ethyl group, propyl group, butyl group, and phenyl group; and the like. Among these alkylene groups, preferred is a linear alkylene group having 4 to 15 carbon atoms, and particularly preferred is a linear alkylene group having 6 to 12 carbon atoms.

In the above general formula (I), two or more of $R^5$ may be the same or different from each other in the case that n is 0. Also, the polyamine may be a polyamine wherein two or more of $R^5$ is composed of a combination of a small amount of an alkylene group having a small number of carbon atoms such as methylene group, ethylene group, or propylene group and an alkylene group having a large number of carbon atoms such as hexamethylene group or decamethylene group. However, in such a combination case, the use of too high ratio of methylene group results in a polyamine which has a high melting point and is very hard, so that the dispersibility into a binder resin tends to be poor in the kneading process. Also, the use of too high ratio of ethylene group or propylene group results in a polyamine which has strong hydrophilicity owing to piperazine group and thus strong affinity with water, so that the polyamine adsorbs the moisture in air at its mixing with a toner and therefore, the charged amount tends to decrease. Accordingly, in the case of combined use of an alkylene group having a small number of carbon atoms, the ratio of the alkylene group having a small number of carbon atoms is preferably 10 mol % or less relative to all of $R^5$.

On the other hand, in the above general formula (I), a polyamine wherein n is 0 and all of $R^5$ are methylene groups has a high melting point and is very hard, so that the dispersibility into a binder resin is poor in the kneading process, and thus, it is impossible to use.

In the case that n is 1, A represents a phenylene group in which hydrogen atom(s) on the ring may be replaced by alkyl group(s) having 1 to 4 carbon atoms, and the phenylene group may be any of p-phenylene group, m-phenylene group, or o-phenylene group, but particularly preferred is p-phenylene group. $R^5$ and $R^6$ each independently represents an alkylene group having 1 to 8 carbon atoms, but sum of the carbon atoms of the alkylene groups of $R^5$ and $R^6$ ranges from 2 to 9.

In the case that n is 1, examples of $R^5$ and $R^6$ include methylene group, ethylene group, propylene group, butylene group, pentamethylene group, hexamethylene group, heptamethylene group, and octamethylene group.

In the above general formula (I), preferred is a polyamine wherein n is 0, all of $R^1$ to $R^4$ are hydrogen atoms, and $R^5$ is a linear alkylene group having 4 to 15 carbon atoms, and particularly preferred is the polyamine wherein $R^5$ is a linear alkylene group having 6 to 12 carbon atoms. Also, in the above general formula (I), particularly preferred is a polyamine wherein, n is 1, all of $R^1$ to $R^4$ are hydrogen atoms, A is p-phenylene group, and both of $R^5$ and $R^6$ are methylene groups.

In general, a polyamine for use in the invention can be easily produced by dissolving a compound having a piperazine skeleton in an organic solvent, adding dropwise a dihalide such as a dihalogenoalkane or an alkane-disulfonate compound such as hexane-1,6-di-p-toluenesulfonate thereto at an elevated temperature to effect the reaction therebetween, and then neutralizing the resulting product with an alkali.

The compound having a piperazine skeleton for use as a synthetic raw material of the polyamine is not particularly limited as far as the secondary amino groups of the piperazine skeleton are reactive and the carbon atoms of the skeleton have hydrogen atom(s) or alkyl group(s) having 1 to 4 carbon atoms. Examples of such a compound having a piperazine skeleton include piperazine, 2-methylpiperazine, 2-butylpiperazine, 2,3-dimethylpiperazine, 2,3,5-trimethylpiperazine, 2,3,5,6-tetramethylpiperazine, and the like. Among them, particularly preferred are piperazine and 2-methyl piperazine. Moreover, these compounds having a piperazine skeleton may be used solely or in combination.

Examples of the dihalide for use as a synthetic raw material of the polyamine include 1,4-dichlorobutane, 1,5-dichloropentane, 1,6-dichlorohexane, 1,7-dichloroheptane, 1,8-dichlorooctane, 1,9-dichlorononane, 1,10-dichlorodecane, 1,11-dichloroundecane, 1,12-dichlorododecane, 1,13-dichlorotridecane, 1,14-dichlorotetradecane, 1,15-dichloropentadecane, 1,6-dibromohexane, 1,8-dibromooctane, 1,6-diiodohexane, 2,2-dimethyl-1,3-dichloropropane, p-xylylene dichloride, m-xylylene dichloride, o-xylylene dichloride, and the like. Among them, particularly preferred are 1,6-dichlorohexane, 1,8-dichlorooctane, and 1,10-dichlorodecane.

These dihalides may be used solely or in combination. In the case that the ratio of the dihalides having a small number of carbon atoms such as dichloromethane, 1,2-dichloroethane, or 1,3-dichloropropane is high, especially in the case that dichloromethane is used, the resulting polyamine has an increased melting point, and the dispersibility into a binder resin tends to be poor at the kneading of the polyamine with the binder resin. Also, in the case that especially 1,2-dichloroethane or 1,3-dichloropropane is used, the resulting polyamine maintain strong affinity with water, so that the polyamine adsorbs the moisture in air at its mixing with a toner and therefore, the charged amount tends to decrease. Accordingly, in the case that a dihalide having a small number of carbon atoms, it is preferable to use the dihalide having a small number of carbon atoms in combination with other dihalide such as 1,6-dichlorohexane or 1,10-dichlorodecane. In the case that the dihalide having a small number of carbon atoms is used, the ratio of the dihalide is preferably 10 wt % or less relative to total dihalides.

Examples of the alkane-disulfonate compound for use as a synthetic raw material of the polyamine include butane-1,4-di-p-toluenesulfonate, hexane-1,6-di-p-toluenesulfonate, octane-1,8-di-p-toluenesulfonate, and the like. Among them, particularly preferred is hexane-1,6-di-p-toluenesulfonate.

Moreover, the molar ratio of the above compound having a piperazine skeleton to the dihalide or alkane-disulfonate compound is preferably in the range of 0.5 to 2.0, particularly preferably in the range of 0.8 to 1.5.

Furthermore, after the compound having a piperazine skeleton and the dihalide or the like have been subjected to a predetermined reaction, the resulting polyamine wherein an imino group is left at the ends may be used after reacting it with a small amount of formalin. At that time, when the ratio of formalin is too high, the melting point of the resulting polyamine is raised and the dispersibility into a binder resin tends to be poor at the kneading. Therefore, the ratio is preferably 10 mol % or less relative to total alkylenes.

The number-average molecular weight of the polyamine for use in the invention is preferably in the range of 500 to 100,000, particularly preferably in the range of 5,000 to 30,000. In the case that the number-average molecular weight of the polyamine is less than 500, the polyamine has a low melting point and tends to fly, when kneading during the conversion to a toner. In the case that the number-average molecular weight of the polyamine exceeds 100,000, the dispersibility at the above kneading tends to be poor. Thus, the both cases are not preferred.

The charge-controlling agent comprising a polyamine having a repeating structure represented by the general formula (I), which is used in the invention, is useful as a positively chargeable charge-controlling agent for controlling chargeabilities of toners for use in electrophotography and the like.

The method for incorporating the charge-controlling agent of the invention into a toner is not particularly limited. For example, there may be mentioned a method wherein a compound to be used as a charge-controlling agent is preliminary pulverized and, after further classification, if necessary, the resulting powder is mixed and kneaded with a toner resin, a colorant, and other toner-constituting components.

The amount of the charge-controlling agent of the invention at the incorporation into a toner is preferably in the range of 0.1 to 15 parts by weight, particularly preferably in the range of 0.5 to 10 parts by weight relative to 100 parts by weight of a toner resin. In the case that the ratio of the charge-controlling agent in the toner is less than 0.1 part by weight, initial chargeability is deteriorated or the toner tends to fly. On the other hand, in the case that the ratio of the charge-controlling agent in the toner exceeds 15 parts by weight, the stability of charge-level tends to be poor. Thus, the both cases are not preferred.

A positively chargeable toner can be obtained by adding the charge-controlling agent of the invention in accordance with the above method. Moreover, other charge-controlling agent may be used in combination unless the performance of the above charge-controlling agent and the purpose of the toner are deteriorated. The charge-controlling agent of the invention may be also used together with a negatively chargeable charge-controlling agent if necessary for controlling the charged amount, and thus, it is possible to use as a charge-controlling agent for not only a positively chargeable toner but also a negatively chargeable toner.

As a toner resin (binder resin) for use in the toner of the invention, any of the hitherto known toner resins used for electrophotography may be employed without particular limitation. Examples of such toner resins include styrene resins such as polystyrene, styrene-(meth)acrylate copolymers, styrene-(meth)acrylate-acrylonitrile copolymers, styrene-butadiene copolymer, styrene-vinyl chloride copolymer, and styrene-maleic acid copolymer, polyester resins, epoxy resins, (meth)acrylic resins, phenol resins, xylene resins, vinyl chloride resins, polyurethane resins, polyvinyl butyral resins, and the like. Among them, particularly preferred are styrene-(meth)acrylate resins and polyester resins. Generally, one of these resins is employed but two or more of them may be employed, if necessary.

As colorants for use in the toner of the invention, hitherto known various organic pigments, inorganic pigments, dyes, and the like may be employed. Specific examples thereof include black pigments such as carbon black; blue pigments such as phthalocyanine blue, aniline blue, and ultramarine blue; green pigments such as malachite green, phthalocyanine green, and brilliant green; red pigments such as rose bengal, permanent red, irgasine red, and toluidine red; yellow pigments such as benzidine yellow, quinoline yellow, fast yellow G, and hanza yellow; triaryl methane dyes, azo dyes, nigrosine dyes, and the like.

To the toner of the invention, hitherto known additives such as higher fatty acid and metal salts thereof, natural or synthetic waxes, and the like may be added, if necessary.

The toner of the invention is applicable to both of a two-component developer and a single-component developer. For example, in the case that the toner of the invention is used as two-component developer, the toner is used in combination with carrier powder. Examples of the carrier powder for use therein include magnetic powders such as iron powder, ferrite powder, and nickel powder, glass beads, and the like, as well as coating carriers obtainable by treating the surface of the above carrier powders with a resin.

In the case that the toner of the invention is used as a single-component developer, there may be used a dispersion obtainable by adding an appropriate amount of a magnetic fine powder such as iron powder or ferrite powder at the production of the toner, or a non-magnetic single-component type containing no magnetic powder.

The polyamine represented by the general formula (I) for use as the charge-controlling agent of the invention has a considerably high charge level as compared with the quaternary ammonium salts hitherto used, and is highly excellent in stability of charge-level with the lapse of time as compared with nigrosine. Moreover, since the polyamine is light in color, it is extremely useful as a charge-controlling agent for not only black toners but also color toners.

EXAMPLES

The present invention will be illustrated in greater detail with reference to the following Examples and Comparative Examples, but the invention should not be construed as being limited thereto. All the "parts" and "%" are given by weight unless otherwise indicated.

Synthesis Example 1

Into a one-litter four-necked flask equipped with a reflux condenser, a thermometer, a decanter and a stirring apparatus were placed 100 g of piperazine and 150 g of ethanol. Then, the content was heated to 80° C. under stirring and, while maintaining the temperature, 175 g of 1,6-dichlorohexane was added dropwise thereto. After completion of the addition, the reaction was continued for further 4 hours under stirring. Thereafter, 90 g of ethanol was removed by distillation, then, a solution of 92 g of 98% sodium hydroxide dissolved in 200 g of deionized water was added thereto, and a neutralizing reaction was carried out at 90° C. for 1 hour. Then, the content was filtrated, further washed, and finally dried at 110° C. for 3 hours to obtain 169 g of a polyamine (P-1). The polyamine (P-1) was light in color and had a melting point of 148 to 150° C. and a number-average molecular weight (hereinafter, abbreviated as "Mn") of 22,000 (based on polymethyl methacrylate).

Synthesis Examples 2 to 6

A compound having a piperazine skeleton and a dihalide were reacted in a similar manner to Synthesis Example 1 to obtain each of polyamines (P-2) to (P-6) shown in Tables 1 and 2.

Synthesis Example 7

Into a two-litter four-necked flask equipped with a reflux condenser, a thermometer, a decanter and a stirring apparatus were placed 100 g of piperazine, 365 g of ethanol, and 365 g of deionized water. Then, the content was heated to 80° under stirring and, while maintaining the temperature, 182 g of p-xylylene dichloride was gradually added thereto. The reaction was continued for further 4 hours under stirring. Thereafter, a solution of 84.7 g of 98% sodium hydroxide dissolved in 164 g of deionized water was added thereto and, while ethanol was removed by distillation until the inner temperature reached 96° C., a neutralizing reaction was carried out. Then, the product was diluted with 500 g of deionized water, and then, it was filtrated, washed, and finally dried at 120° C. for 5 hours to obtain 172 g of a polyamine (P-7). This compound was white and had a melting point of 290 to 299° C. and a number-average molecular weight of 8,000 (based on polymethyl methacrylate).

Comparative Synthesis Example 1

Into a one-litter four-necked flask equipped with a reflux condenser, a thermometer, and a stirring apparatus were placed 100 g of piperazine, 21 g of benzylamine, and 340 g of deionized water. Then, the content was heated to 65° C. under stirring and, while maintaining the temperature, 104 g of formalin (37% aqueous formaldehyde solution) was added thereto over a period of 1 hour. After completion of the addition, the temperature was raised to 80° C. and the reaction was continued for further 2 hours under stirring. Thereafter, the content was filtrated, washed, and dried at 110° C. for 3 hours to obtain 130 g of a polyamine (P-8). This compound was white and had a melting point of 289 to 295° C. and a number-average molecular weight of 23,000.

Comparative Synthesis Example 2

Into a one-litter four-necked flask equipped with a reflux condenser, a thermometer, and a stirring apparatus were placed 100 g of piperazine and 340 g of deionized water. Then, the content was heated to 65° C. under stirring and, while maintaining the temperature, 84 g of formalin (37% aqueous formaldehyde solution) was added thereto over a period of 1 hour. After completion of the addition, the temperature was raised to 80° C. and the reaction was continued for further 2 hours under stirring. Thereafter, the content was filtrated, washed, and dried at 110° C. for 3 hours to obtain 100 g of a polyamine (P-9). This compound was white and had a melting point of 300° C. or more and a number-average molecular weight of 30,000.

TABLE 1

| | Piperazine compound | Dihalide compound | Yield | Mn | Melting point (°C.) | Polyamine Nos. |
|---|---|---|---|---|---|---|
| Synthesis Example 1 | piperazine 100 g | 1,6-DCH 175 g | 169 g | 22,000 | 148–150 | P-1 |
| Synthesis Example 2 | piperazine 100 g | 1,6-DCH 157 g 1,8-DCO 21 g | 178 g | 21,000 | 145–147 | P-2 |
| Synthesis Example 3 | piperazine 100 g | 1,6-DCH 157 g 1,10-DCD 24 g | 182 g | 21,000 | 141–143 | P-3 |
| Synthesis Example 4 | piperazine 100 g | 1,6-DCH 166 g 1,4-DCB 7 g | 165 g | 23,000 | 143–145 | P-4 |
| Synthesis Example 5 | piperazine 100 g | 1,6-DCH 166 g p-XDC 6 g | 160 g | 25,000 | 148–150 | P-5 |

TABLE 2

| | Piperazine compound | Dihalide compound | Yield | Mn | Melting point (°C.) | Polyamine Nos. |
|---|---|---|---|---|---|---|
| Synthesis Example 6 | 2,5-dimethyl-piperazine 100 g | 1,6-DCH 129 g | 125 g | 20,000 | 140–143 | P-6 |
| Synthesis Example 7 | piperazine 100 g | p-XDC 182 g | 172 g | 8,000 | 290–299 | P-7 |

TABLE 2-continued

| | Piperazine compound | Dihalide compound | Yield | Mn | Melting point (°C.) | Polyamine Nos. |
|---|---|---|---|---|---|---|
| Comparative Synthesis Example 1 | piperazine 100 g | benzylamine 21 g formalin 104 g | 130 g | 23,000 | 289–295 | P-8 |
| Comparative Synthesis Example 2 | piperazine 100 g | formalin 84 g | 100 g | 30,000 | >300 | P-9 |

The symbols in the above tables are as follows:
1,6-DCH: 1,6-dichlorohexane
1,8-DCO: 1,8-dichlorooctane
1,10-DCD: 1,10-dichlorodecane
1,4-DCB: 1,4-dichlorobutane
p-XDC: p-xylylene dichloride

Example 1

One hundred parts of a polyester resin for toner (glass transition temperature (Tg)=61° C., acid value≅7, Mw≅10,000, Mn≅4,700), 1.5 parts of polyamine (P-1) obtained in Synthesis Example 1, 5 parts of carbon black (MA-100, manufactured by Mitsubishi Chemical Co., Ltd.), and 2 parts of a propylene wax ("Viscol 550P" manufactured by Sanyo Chemical Industries, Ltd.) were preliminary mixed in Henschell mixer, and then the mixture was kneaded in a heating roll mill, followed by cooling to room temperature. Thereafter, the mixture was finely pulverized in a jet mill and further classified to obtain a powder having an average particle size of 10 μm, whereby a black toner was prepared.

Examples 2 to 7

A black toner was prepared in a similar manner to Example 1 with the exception that each of polyamines (P-2) to (P-7) obtained in Synthesis Examples 2 to 7, respectively, was employed instead of polyamine (P-1) obtained in Synthesis Example 1.

Comparative Example 1

A black toner was prepared in a similar manner to Example 1 with the exception that polyamine (P-8) obtained in Comparative Synthesis Example 1 was employed instead of polyamine (P-1) obtained in Synthesis Example 1.

Comparative Example 2

A black toner was prepared in a similar manner to Example 1 with the exception that polyamine (P-9) obtained in Comparative Synthesis Example 2 was employed instead of polyamine (P-1) obtained in Synthesis Example 1. Since polyamine (P-9) had a high melting point and was a hard compound, dispersibility thereof in the polyester resin was extremely poor.

Comparative Example 3

A black toner was prepared in a similar manner to Example 1 with the exception that a compound (P-10) represented by the formula shown below was employed instead of polyamine (P-1) obtained in Synthesis Example 1.

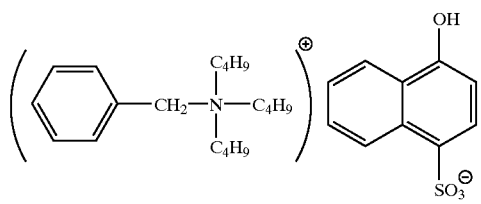

Comparative Example 4

A black toner was prepared in a similar manner to Example 1 with the exception that a commercial nigrosine (Bontron N-04, a kneaded product with a resin, which contains about 55% as nigrosine base) was employed instead of polyamine (P-1) obtained in Synthesis Example 1.

Method for Evaluation of Toners (A) Measurement of the Charged Amount:

Four grams each of toners obtained in Examples 1 to 7 and Comparative Examples 1 to 4 and 96 g of ferrite carrier treated with a silicone resin were placed into a 100 ml plastic bottle. The plastic bottle was set on a ball mill and, while stirring at a rotating rate of 200 rpm, sampling was carried out after the passage of 3 minutes, 10 minutes, and 60 minutes. The charged amount of each sample was measured by means of a blowoff charge amount measuring apparatus "TB-200" manufactured by Toshiba Chemical Corporation. The results are summarized in Tables 3 and 4. In the tables, those wherein the charged amount was not stable with time are judged to be inferior at the evaluation.

TABLE 3

| | | Example 1 | Example 2 | Example 3 | Example 4 | Example 5 | Example 6 | Example 7 |
|---|---|---|---|---|---|---|---|---|
| Polyamine employed | | P-1 | P-2 | P-3 | P-4 | P-5 | P-6 | P-7 |
| Charged amount +µC/g | 3 mm | 6.6 | 6.2 | 6.2 | 6.6 | 5.7 | 6.2 | 5.5 |
| | 10 mm | 11.3 | 11.0 | 10.8 | 11.5 | 10.6 | 11.0 | 10.0 |
| | 30 mm | 12.0 | 11.9 | 11.9 | 12.1 | 11.5 | 11.5 | 10.8 |
| | 60 mm | 12.1 | 12.2 | 12.1 | 12.3 | 11.7 | 12.0 | 11.0 |

TABLE 4

| | | Comparative Example 1 | Comparative Example 2 | Comparative Example 3 | Comparative Example 4 |
|---|---|---|---|---|---|
| Polyamine employed | | P-8 | P-9 | P-10 | Bontron N-04 |
| Charged amount +µC/g | 3 mm | 5.0 | 4.2 | 2.1 | 7.2 |
| | 10 mm | 9.8 | 10.5 | 4.6 | 12.5 |
| | 30 mm | 10.5 | 9.5 | 7.2 | 14.9 |
| | 60 mm | 10.5 | 6.8 | 9.8 | 19.4 |

(B) Printing Test:

Using the toners obtained in Examples 1 to 7 and Comparative Examples 1 to 4, printing tests were carried out on a commercially available magnetic two-component developing machine, wherein the optical density (OD) of solid printed image was measured on (1) the 10th sheet and (2) the 50,000th sheet after the start of the printing by means of a Macbeth densitometer. The results are summarized in Tables 5 and 6. In the tables, those wherein OD is not stable with time are judged to be inferior at the evaluation. By the way, with regard to the toner wherein the polyamine (P-9) was employed as a charge-controlling agent, the test on the 50,000th sheet was not carried out since fogging was already observed at the test on the 10th sheet.

(C.I.Pig.No. B-15-4 manufactured by Dainippon Ink & Chemicals, Inc.), and 2 parts of a propylene wax ("Viscol 550P" manufactured by Sanyo Chemical Industries, Ltd.) were preliminary mixed in Henschell mixer, and then the mixture was melt-kneaded in a heating roll mill, followed by cooling to room temperature. Thereafter, the mixture was finely pulverized in a jet mill and further classified to obtain a blue toner as a powder having an average particle size of 10 µm.

Examples 9 to 12

A blue toner was prepared in a similar manner to Example 8 with the exception that polyamine (P-2), (P-3), (P-5), or (P-6) obtained in Synthesis Example 2, 3, 5, or 6, respectively, was employed instead of polyamine (P-1) obtained in Synthesis Example 1.

Comparative Examples 5 and 6

A blue toner was prepared in a similar manner to Example 8 with the exception that polyamine (P-8) obtained in Comparative Synthesis Example 1 or compound (P-10) employed in Comparative Example 3 was employed instead of polyamine (P-1) obtained in Synthesis Example

TABLE 5

| | | Example 1 | Example 2 | Example 3 | Example 4 | Example 5 | Example 6 | Example 7 |
|---|---|---|---|---|---|---|---|---|
| Polyamine employed | | P-1 | P-2 | P-3 | P-4 | P-5 | P-6 | P-7 |
| OD | 10th sheet | 1.47 | 1.48 | 1.47 | 1.47 | 1.45 | 1.46 | 1.48 |
| | 50000th sheet | 1.40 | 1.41 | 1.41 | 1.40 | 1.43 | 1.40 | 1.40 |

TABLE 6

| | | Comparative Example 1 | Comparative Example 2 | Comparative Example 3 | Comparative Example 4 |
|---|---|---|---|---|---|
| Polyamine employed | | P-8 | P-9 | P-10 | Bontron N-04 |
| OD | 10th sheet | 1.46 | 1.35 (fogging) | 1.55 | 1.39 |
| | 50000th sheet | 1.40 | | 1.47 | 1.19 |

Example 8

One hundred parts of a polyester resin for toner (glass transition temperature (Tg)=61° C., acid value≅7, Mw≅10,000, Mn≅4,700), 0.7 part of polyamine (P-1) obtained in Synthesis Example 1, 4 parts of KET BLUE 106

On each of the blue toners obtained in Examples 8 to 12 and Comparative Example 5 and 6, measurement of the charged amount and printing test were carried out in a similar manner to (A) and (B) of Example 1. The results are summarized in Tables 7 and 8.

TABLE 7

|  |  | Example 8 | Example 9 | Example 10 | Example 11 | Example 12 | Comp. Ex. 5 | Comp. Ex. 6 |
|---|---|---|---|---|---|---|---|---|
| Polyamine employed |  | P-1 | P-2 | P-3 | P-5 | P-6 | P-8 | P-10 |
| Charged | 3 mm | 6.0 | 5.8 | 5.8 | 4.9 | 6.0 | 5.3 | 2.6 |
| amount | 10 mm | 10.9 | 10.9 | 10.6 | 10.0 | 10.5 | 9.8 | 4.4 |
| +$\mu$C/g | 30 mm | 11.6 | 11.4 | 11.5 | 10.7 | 11.4 | 10.5 | 6.3 |
|  | 60 mm | 11.8 | 11.5 | 11.7 | 10.9 | 11.7 | 10.4 | 8.0 |

TABLE 8

|  |  | Example 1 | Example 2 | Example 3 | Example 4 | Example 5 | Comp. Ex. 5 | Comp. Ex. 6 |
|---|---|---|---|---|---|---|---|---|
| Polyamine employed |  | P-1 | P-2 | P-3 | P-5 | P-6 | P-8 | P-10 |
| OD | 10th sheet | 1.38 | 1.39 | 1.39 | 1.38 | 1.36 | 1.36 | 1.47 |
|  | 50000th sheet | 1.33 | 1.33 | 1.32 | 1.32 | 1.32 | 1.32 | 1.40 |

Example 13

One hundred parts of a polyester resin for toner (glass transition temperature (Tg)=65.6° C., acid value 10, Mw≅10,000, Mn≅4,800), 0.7 part of polyamine (P-1) obtained in Synthesis Example 1, 6 parts of KET RED 309 (C.I.Pig.No. R-122 manufactured by Dainippon Ink & Chemicals, Inc.), and 2 parts of a propylene wax ("Viscol 550P" manufactured by Sanyo Chemical Industries, Ltd.) were preliminary mixed in Henschell mixer, and then the mixture was melt-kneaded in a heating roll mill, followed by cooling to room temperature. Thereafter, the mixture was finely pulverized in a jet mill and further classified to obtain a red toner as a powder having an average particle size of 10 $\mu$m.

Examples 14 to 18

A red toner was prepared in a similar manner to Example 13 with the exception that each of polyamines (P-3) to (P-7) obtained in Synthesis Examples 3 to 7, respectively, was employed instead of polyamine (P-1) obtained in Synthesis Example 1.

Comparative Examples 7 and 8

A red toner was prepared in a similar manner to Example 13 with the exception that polyamine (P-8) obtained in Comparative Synthesis Example 1 or compound (P-10) employed in Comparative Example 3 was employed instead of polyamine (P-1) obtained in Synthesis Example 1.

On each of the red toners obtained in Examples 13 to 18 and Comparative Example 7 and 8, measurement of the charged amount was carried out in a similar manner to (A) of Example 1. The results are summarized in Tables 9 and 10.

TABLE 9

|  |  | Example 13 | Example 14 | Example 15 | Example 16 | Example 17 | Example 18 |
|---|---|---|---|---|---|---|---|
| Polyamine employed |  | P-1 | P-3 | P-4 | P-5 | P-6 | P-7 |
| Charged | 3 mm | 5.8 | 5.6 | 5.6 | 5.2 | 5.7 | 4.8 |
| amount | 10 mm | 10.6 | 10.5 | 10.8 | 10.6 | 11.0 | 9.3 |
| +$\mu$C/g | 30 mm | 11.4 | 11.3 | 11.7 | 11.4 | 11.8 | 10.0 |
|  | 60 mm | 11.6 | 11.4 | 12.0 | 11.2 | 12.0 | 10.3 |

TABLE 10

|  |  | Comp. Ex. 13 | Comp. Ex. 14 |
|---|---|---|---|
| Polyamine employed |  | P-1 | P-3 |
| Charged | 3 min | 3.5 | 2.3 |
| amount | 10 min | 7.7 | 4.5 |
| +$\mu$C/g | 30 min | 8.4 | 6.6 |
|  | 60 min | 8.7 | 8.6 |

Example 19

One hundred parts of a polyester resin for toner (glass transition temperature (Tg)=65.6° C., acid value≅10, Mw≅10,000, Mn≅4,800), 0.7 part of polyamine (P-1) obtained in Synthesis Example 1, 4 parts of Toner Yellow HG (C.I.Pig.No. 180 manufactured by Clariant GmbH), and 2 parts of a propylene wax ("Viscol 550P" manufactured by Sanyo Chemical Industries, Ltd.) were preliminary mixed in Henschell mixer, and then the mixture was melt-kneaded in a heating roll mill, followed by cooling to room temperature. Thereafter, the mixture was finely pulverized in a jet mill and further classified to obtain a yellow toner as a powder having an average particle size of 10 $\mu$m.

Examples 20 to 22

A yellow toner was prepared in a similar manner to Example 19 with the exception that each of polyamines (P-2), (P-3), and (P-6) obtained in Synthesis Examples 2, 3, and 6, respectively, was employed instead of polyamine (P-1) obtained in Synthesis Example 1.

Comparative Examples 9 and 10

A yellow toner was prepared in a similar manner to Example 19 with the exception that polyamine (P-8) obtained in Comparative Synthesis Example 1 or compound (P-10) employed in Comparative Example 3 was employed instead of polyamine (P-1) obtained in Synthesis Example 1.

On each of the yellow toners obtained in Examples 19 to 22 and Comparative Example 9 and 10, measurement of the charged amount was carried out in a similar manner to (A) of Example 1. The results are summarized in Table 11.

TABLE 11

|  |  | Example 19 | Example 20 | Example 21 | Example 22 | Comp. Ex. 9 | Comp. Ex. 10 |
|---|---|---|---|---|---|---|---|
| Polyamine employed | | P-1 | P-2 | P-3 | P-6 | P-8 | P-10 |
| Charged | 3 mm | 6.3 | 5.9 | 5.8 | 6.4 | 3.4 | 1.8 |
| amount | 10 mm | 11.0 | 10.8 | 10.6 | 11.0 | 7.6 | 3.8 |
| $+\mu C/g$ | 30 mm | 11.8 | 11.3 | 11.5 | 12.2 | 8.0 | 5.3 |
|  | 60 mm | 11.6 | 11.5 | 11.6 | 12.2 | 8.2 | 6.9 |

Examples 23 to 29 and Comparative Examples 11 to 13
Measurement of the Emitted Amount of VOC Into a 10 ml head space bottle was placed 50 mg each of polyamines (P-1) to (P-7) obtained in Synthesis Examples 1 to 7, respectively, polyamine (P-8) obtained in Comparative Synthesis Example 1, compound (P-10) employed in Comparative Example 3, and Bontron N-04 employed in Comparative Example 4. After replacement by helium gas, each bottle was heated at 200° C. for 5 minutes and a gas containing volatile components emitted during the heating was condensed by the Cryo-method, followed by measurement on a total ion chromatograph (TIC). The volatile components were quantitatively determined, toluene being used as a standard substance. The results are summarized in Tables 12 and 13. As shown in the results, the amount of VOC in each example wherein one of polyamines (P-1) to (P-7) was employed was very small as compared with the amount in each example wherein one of polyamine (P-8), compound (P-10), or Bontron N-04 was employed.

TABLE 12

|  | Example 23 | Example 24 | Example 25 | Example 26 | Example 27 | Example 28 | Example 29 |
|---|---|---|---|---|---|---|---|
| Name of polyamine | P-1 | P-2 | P-3 | P-4 | P-5 | P-6 | P-7 |
| Amount of VOC (ppm) | 51 | 46 | 40 | 67 | 60 | 43 | 88 |

TABLE 13

|  | Comp. Ex. 11 | Comp. Ex. 12 | Comp. Ex. 13 |
|---|---|---|---|
| Name of polyamine | P-8 | P-10 | Bontron N-04 |
| Amount of VOC (ppm) | 1255 irritant smell | 890 smell of amine | 1600 |

From the above evaluation results, the charge-controlling agents of the invention comprising polyamines (P-1) to (P-7) were found to exhibit an average charged amount of 10 to 12 $+\mu C/g$ which is stable with time when they were added to toners. Moreover, all the printing tests using the toners showed satisfactory results. Contrarily, the charge-controlling agent comprising polyamine (P-8) obtained in Comparative Synthesis Example 1 showed satisfactory results in the printing test when it was added to toners but the amount of VOC of polyamine (P-8) was very large. Since polyamine (P-9) obtained in Comparative Synthesis Example 2 had a high melting point and was hard, the charge-controlling agent comprising polyamine (P-9) was extremely inferior in dispersibility in a resin for toner.

Furthermore, in the case of compound (P-10) employed in Comparative Example 3 and commercially available Bontron N-04 employed in Comparative Example 4 showed unstable charged amount with time when they were added to toners and the amounts of VOC were very large.

The charge-controlling agent of the invention is light in color and excellent in charging properties, in particular the charged amount and stability of charge-level, so that the agent has advantages that color reproducibility is satisfactory and clear color images is obtainable when it is applied to a color toner. In addition, since the charge-controlling agent of the invention has a satisfactory thermal stability, there is an advantage that the agent can provide a toner capable of suppressing generation of VOC remarkably.

While the invention has been described in detail and with reference to specific examples thereof, it will be apparent to one skilled in the art that various changes and modifications can be made therein without departing from the spirit and scope thereof.

What is claimed is:

1. A charge-controlling agent for controlling chargeablility of toners comprising a polyamine having a repeating structure represented by the following general formula (I):

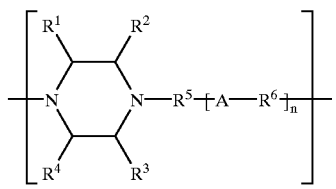

wherein $R^1$ to $R^4$ each independently represents an alkyl group having 1 to 4 carbon atoms or hydrogen atom, n represents 0 or 1, and when n=0, $R^5$ represents an alkylene group having 4 to 15 carbon atoms, which may have a substituent selected from the group consisting of alkyl groups having 1 to 4 carbon atoms and phenyl group, and when n=1, A represents a phenylene group in which the hydrogen atom(s) on the ring may be replaced by alkyl group(s) having 1 to 4 carbon atoms, and $R^5$ and $R^6$ each independently represents an alkylene group having 1 to 8 carbon atoms, provided that the sum of the carbon atoms of the alkylene groups represented by $R^5$ and $R^6$ ranges from 2 to 9.

2. The charge-controlling agent according to claim 1, wherein all of $R^1$ to $R^4$ are hydrogen atoms, n is 0, and $R^5$ is a linear alkylene group having 4 to 15 carbon atoms.

3. The charge-controlling agent according to claim 1, wherein all of $R^1$ to $R^4$ are hydrogen atoms, n is 1, A is p-phenylene group, and both of $R^5$ and $R^6$ are methylene groups.

4. The charge-controlling agent according to claim 1, wherein the polyamine represented by general formula (I) has a number-average molecular weight of 500 to 100,000.

5. A toner comprising a charge-controlling agent according to claim 1.

6. A toner comprising the charge-controlling agent of claim 1, and further comprising:

a binder resin.

7. The toner of claim 6, wherein the binder resin is a polyester resin.

* * * * *